United States Patent

[11] 3,611,042

[72] Inventor Attila Denes Boronkay
La Habra, Calif.
[21] Appl. No. 7,807
[22] Filed Feb. 2, 1970
[45] Patented Oct. 5, 1971
[73] Assignee Beckman Instruments, Inc.

[54] RADIANT ENERGY ANALYZER FEEDBACK SYSTEM
13 Claims, 2 Drawing Figs.

[52] U.S. Cl. ........ 317/31, 317/52, 250/207, 328/9
[51] Int. Cl. ........ H02h 3/20, H02h 7/20
[50] Field of Search ........ 250/207; 328/8, 9, 259; 317/51, 31, 33, 130; 315/159

[56] References Cited
UNITED STATES PATENTS
3,374,357 3/1968 Barlow ........ 250/207
3,437,817 4/1969 Doonan ........ 250/207

*Primary Examiner*—J. D. Miller
*Assistant Examiner*—Harvey Fendelman
*Attorneys*—Paul R. Harder and Robert J. Steinmeyer

ABSTRACT: A radiant energy analyzer is disclosed in which a feedback loop is included to vary an electrical bias to a radiant energy detector in response to selected conditions associated with an electrical signal generated by the detector. The electrical signal is directed to a selective detector where predetermined portions of the signal are detected to develop a control signal. A time constant compensating circuit is connected to receive the control signal from the selective detector. An amplitude modulated oscillator is connected to the time constant compensating circuit and in turn to a rectifier circuit which provides electrical bias for the radiant energy detector in response to the oscillator signal amplitude. An overload protection circuit is provided to connect the signal from the radiant energy detector to the oscillator when the signal exceeds a predetermined threshold. The time constant compensating circuit provides compensation for unequal rise and fall time constants associated with the rectifier circuit so as to include the rectifier circuit within the feedback loop.

INVENTOR.
ATTILA DENES BORONKAY
BY Paul K Harder
ATTORNEY

INVENTOR.
ATTILA DENES BORONKAY
BY Paul K Harder
ATTORNEY

RADIANT ENERGY ANALYZER FEEDBACK SYSTEM

The present invention relates to a feedback loop for a radiant energy and analyzer and in particular to circuits included within the feedback loop of a radiant energy analyzer for biasing and protecting a radiant energy detector.

In the field of dual beam or dual channel radiant energy analyzers, it has been general practice to utilize one of the beams to generate a reference signal to which a sample signal generated from the other beam is compared. The purpose of such an arrangement is to discriminate against variations affecting both the sample and reference signals. One method of obtaining this relationship is using the reference signal to control the electrical bias applied to a radiant energy detector such as a photomultiplier and thereby control the sensitivity of the photomultiplier in response to variations occuring in the reference signal. Thus the effect of variations occurring in both sample and reference beams will be substantially diminished in the sample signal generated by the photomultiplier.

The bias for the photomultiplier is generally provided from a high-voltage supply which is not within the feedback loop. Control of the high-voltage bias to the photomultiplier is obtained through a control vacuum tube placed in series with the bias supply lead to the photomultiplier. Considerable difficulty has been experienced in operating with the control circuit components at the high voltage required for the photomultiplier. Because of the high voltage, solid-state devices are precluded and vacuum tubes must be used. One of the most critical problems confronting designers of photomultiplier feedback systems has been the elimination of the control of the bias at such a high-voltage point. The present invention overcomes this problem.

Those concerned with the development of photomultiplier radiant energy detectors have long recognized the need for overload protection of the photomultiplier. Exposure of the photomultiplier to high-intensity radiant energy can result in the generation of large damaging currents. The present invention fulfills this need for overload protection.

Accordingly, it is the object of the present invention to provide a radiant energy detector variable bias supply within a feedback loop wherein the control of the bias supply is at signal voltage levels.

Another object is to provide a time constant compensation circuit to equalize the different rise and fall time constants inherently associated with the bias supply within the feedback loop.

A further object of the present invention is to protect the radiant energy detector from overload damage by an overload protection circuit which rapidly decreases the bias supply in response to the generation of a larger signal output from the radiant energy detector.

A still further object is to provide a radiant energy detector variable bias supply within a feedback loop which contemplates an amplitude modulated oscillator transformer coupled to a rectifier circuit.

Yet another object of the present invention is to provide a radiant energy detector variable bias supply within a feedback loop which contemplates the use of solid-state semiconductor components thereby eliminating the requirement for high-voltage control vacuum tubes.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
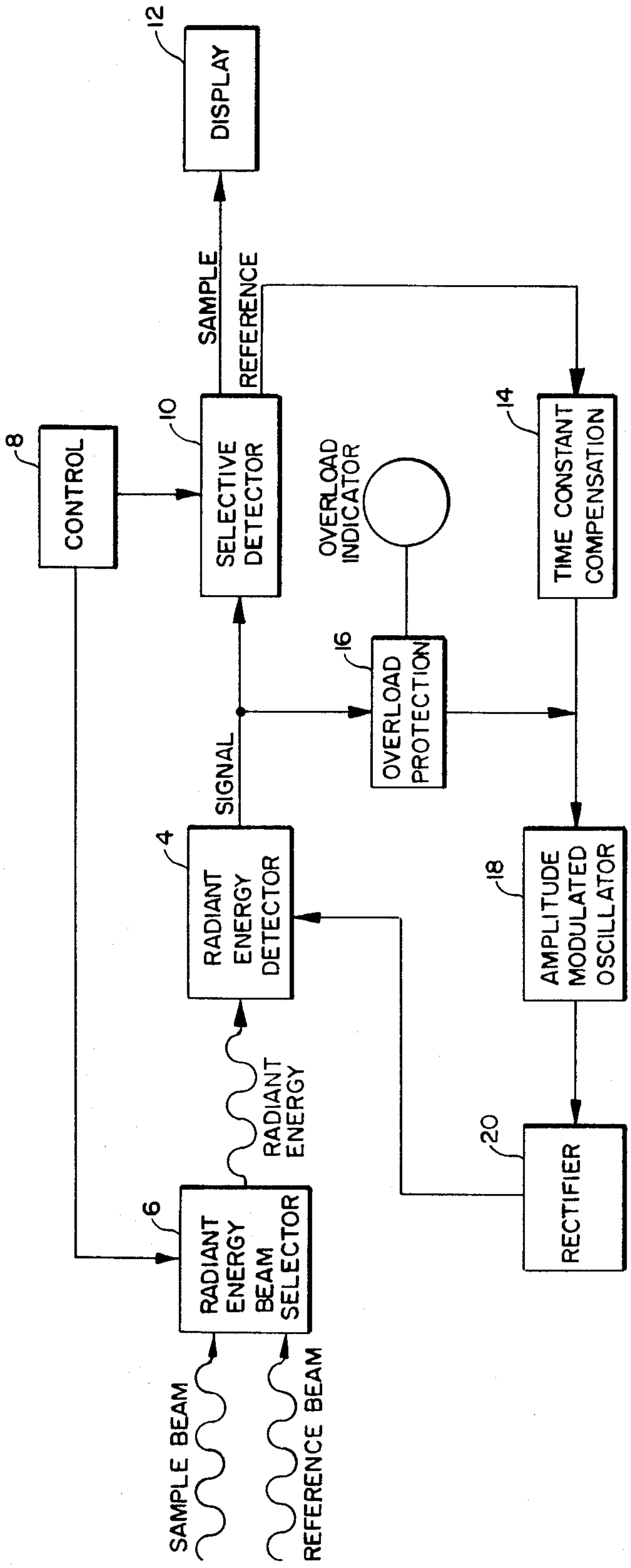
FIG. 1 illustrates a block diagram of the invention.

Referring now to the drawings, there is illustrated in FIG. 1 a radiant energy detector 4 for receiving radiant energy from a radiant energy beam selector 6 which alternately transmits a sample and reference beam under the direction of control 8. For example, control 8 may be a motor which drives a rotating chopper blade as the beam selector 6. An electrical signal generated by radiant energy detector 4 is directed to selective detector 10 which operates under the direction of control 8 so as to produce sample and reference signals derived from portions of the radiant energy detector signal associated respectively with the sample beam and reference beam. Selective detector 10, for example, may be a synchronous detector with mechanical switching driven by the motor control 8. The sample signal is directed to display 12 and the reference signal to time constant compensation 14 which in turn is connected to amplitude modulated oscillator 18. OVerload protection 16 is connected between the output of radiant energy detector 4 and the input to amplitude modulated oscillator 18. The output of amplitude modulated oscillator 18 is rectified by rectifier 20 to provide an electrical bias to the radiant energy detector 4, thereby completing the feedback loop.

Figure 2:
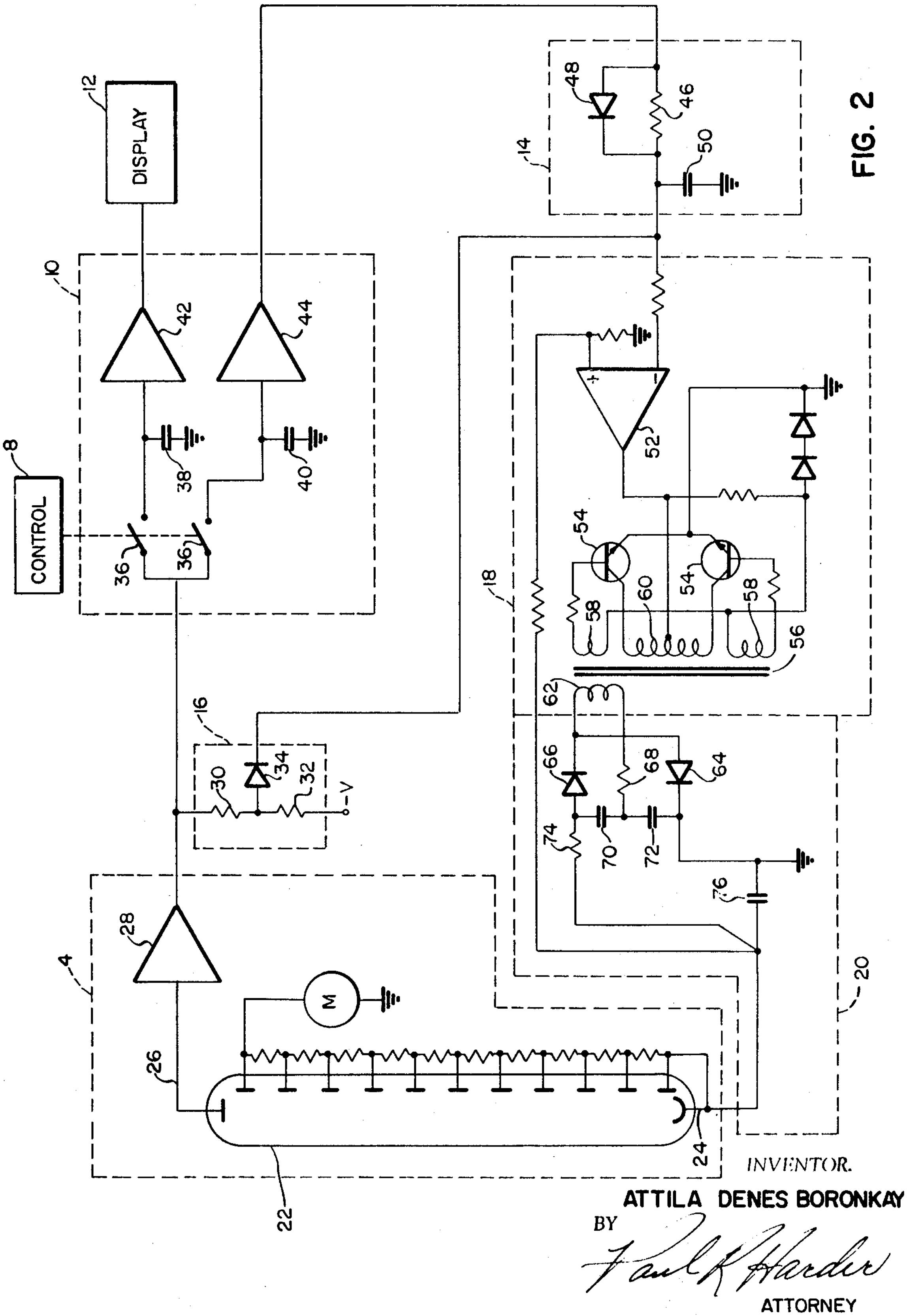
FIG. 2 is a circuit diagram illustrating a preferred embodiment of the present invention.

Turning now to FIG. 2, radiant energy detector 4 comprises photomultiplier 22 having bias electrode 24 and signal electrode 26, which signal electrode is connected to preamplifier 28. Overload protection 16 connected to the output of preamplifier 28 comprises series connected resistors 30 and 32 having the anode of diode 34 connected to the junction thereof. The other end of the series resistors forms a bias terminal to which a threshold determining voltage is applied. Selective detector 10 includes switch 36 operated by control 8 to alternately apply the output signal of radiant energy detector 4 to capacitors 38 and 40. Amplifiers 42 and 44 amplify the signals developed on capacitors 38 and 40 which are respectively applied to display 12 and time constant compensation 14. Time constant compensation 14 includes resistor 46 in parallel with diode 48 connected to capacitor 50, the cathode of diode 48 being connected to the junction of resistor 46 and capacitor 50. This junction is also connected to the cathode of diode 34 in the overload protection circuit 16 and to one input of amplifier 52 which is part of amplitude modulated oscillator 18. Further included in amplitude modulated oscillator 18 is transistor pair 54 connected to transformer 56 having a pair of feedback windings 58, input winding 60 and output winding 62 to form a free-running multivibrator oscillator. The output of amplifier 52 is connected to a center tap of input winding 60 by which power is supplied to the oscillator. Output winding 62 is connected to rectifier 20 in which the cathode of diode 66 is connected to the anode of diode 64 and the junction formed thereby connected to the one end of winding 62. The other end of winding 62 is connected to resistor 68 which in turn is connected to the junction of capacitors 70 and 72. The other end of capacitor 72 is connected to the cathode of diode 64 and the other end of capacitor 70 is connected to the anode of diode 66. The junction of capacitor 70 and diode 66 is further connected to resistor 74 which in turn is connected to capacitor 76. The other end of capacitor 76 is connected to the junction of capacitor 72 and diode 64 and further connected to ground. The junction of capacitor 76 and resistor 74 is connected to the bias anode electrode of photomultiplier 22 thereby completing the feedback loop. The components without number designations are not necessary to understand the application and use of the present invention and are included to illustrate a typical circuit configuration within the teachings of the present invention.

Directing the discussion now to the operation of the radiant energy analyzer feedback system, photomultiplier 22 generates an electrical signal at the signal electrode 26 in response to radiant energy incident thereon. This radiant energy is alternately received from a reference and sample beam. The electrical signal amplified by amplifier 28 is detected in selective detector 10 by switch 36, under direction of control 8, alternately switching the reference portion of the signal to capacitor 40 and the sample portion of the signal to capacitor 38. Therefore a sample signal is developed at capacitor 38 and a reference signal is developed at capacitor 40. As the reference signal increases in a positive direction at the output of amplifier 44, diode 48 is caused to conduct shunting resistor 46 and providing a rapid charging of capacitor 50 thereby producing a short time constant. When the reference signal decreases in a negative direction, diode 48 is rendered nonconducting and capacitor 50 discharges through resistor 46 thereby producing a longer time constant than was obtained when diode 48 shorted resistor 46. By this action different time constants are obtained for rising or falling reference signals, the usefulness of which will become apparent in discussion of the rectifier 20.

It should be noted that more complex compensation circuits are useful in the present invention. For example, a resistor may be placed in series with capacitor 50 to provide a minimum impedance at high frequencies for the series combination. Besides obtaining the desired time constant compensation, the combination provides a minimum impedance to the overload protection circuit 16 described further hereinbelow. In addition, the combination can aid in obtaining a desired feedback gain and phase characteristic by the effect of the "-break-frequency" produced, well known to those skilled in the art of feedback-loop design. A resistor may also be placed in series with diode 48 to provide more accurately matched time constant compensation.

The reference signal appearing at the junction of components 48, 46 and 50 is amplified an appears at the output of amplifier 52. Amplifier 52 provides a low output impedance voltage source which determines the amplitude of the oscillation produced by the multivibrator circuit formed by transistor pair 54 and transformer 56. The reference signal is inverted and offset by amplifier 52 such that a positively increasing reference signal applied at the input of amplifier 52 results in a decreasing positive output signal from amplifier 52. Therefore, as the reference signal input to amplifier 52 increases positively the amplitude of the oscillation of the multivibrator formed by transistor pair 54 and transformer 56 decreases in response to the decreasing output of amplifier 52. The amplitude of the oscillation is detected by rectifier 20 which is connected as a voltage-doubling circuit. Resistor 68 limits the peak current which can flow through diodes 64 and 66 to provide current protection for these diodes. Diodes 64 and 66 alternately conduct on each half cycle of the voltage output from winding 62 to apply the peak voltage appearing at winding 62 across both capacitors 70 and 72 of such a polarity that twice the peak voltage appears between the junction of capacitor 70 and diode 66 and the junction of capacitor 72 and diode 64 thereby doubling the voltage normally available from winding 62. Resistor 74 and capacitor 76 further filter this doubled voltage which is finally applied to bias photomultiplier 22.

Since resistor 68 and the internal resistance of winding 62 are considerably smaller than resistor 74 and the load resistance provided by photomultiplier 22, different rising and falling time constants are produced by rectifier 20. If resistor 68 were increased in magnitude in an attempt to equalize these time constants, a considerable reduction in voltage available to capacitors 70 and 72 would result thereby significantly reducing the available bias voltage for the photomultiplier 22. Rather than attempt to equalize the time constants in this manner which degrades the rectifier performance, time constant compensation 14 is provided. Therefore, the discharge of capacitors 70, 72 and 76 producing a long time constant is compensated by the conduction of diode 48 which bypasses resistor 46 to produce a short time constant with capacitor 50. As indicated hereinbefore, a resistor can be placed in series with diode 48 to obtain a more accurate match of time constants, if desired. On the other hand, the short time constant associated with the charging of capacitors 70 and 72 and in turn 76 is compensated by the increased time constant formed by resistor 46 and capacitor 50 with diode 48 in the nonconducting state.

Directing the discussion of operation to overload protection 16, when photomultiplier 22 is inadvertently exposed to a high level of radiant energy, a large positive output signal is generated at the output of amplifier 28. Because one end of resistor 32 is connected to a negative voltage and the output of amplifier 28 is normally close to a ground potential as will also be the input to amplitude modulated oscillator 18, diode 34 is normally back biased and nonconducting. The normally negative potential at the anode relative to the cathode of diode 34 is overcome by the large positive signal at the output of amplifier 28. When this signal produces a voltage at the junction of resistors 30 and 32 which is more positive than the voltage appearing at the input to amplitude modulated oscillator 18, diode 34 is forward biased and a conducting path is established. The circuit acts as a threshold device which produces an output voltage in response to an input voltage exceeding a predetermined threshold. When diode 34 conducts, the increasing positive voltage appearing at the anode thereof is applied to the input to the amplitude-modulated oscillator thereby bypassing that portion of the feedback loop including selective detector 10 and time constant compensation 14. This provides a rapid response of the amplitude modulated oscillator to the positive signal appearing at the output of amplifier 28 which quickly reduces the amplitude of oscillation to decrease the bias applied to the photomultiplier. Since under the circumstances of overload the photomultiplier will be drawing a large current, the bias applied to the photomultiplier will decrease rapidly to a value established by overload protection 16. Upon removal of the high-intensity radiation to the photomultiplier, the positive signal from amplifier 28 decreases and the overload protection 16 drops out by reestablishing the normally nonconducting condition of diode 34.

Although not illustrated in FIG. 2, it is possible to connect an indicator circuit to diode 34 to indicate when overload occurs. A separate threshold circuit similar to overload protection 16 may be used to drive an indicator or the indicator may be driven from diode 34 directly. The indicator may consist of at least one transistor normally biased "off" and which is turned "on" during overload to supply current to an indicator lamp or audible alarm.

The radiant energy analyzer feedback system described and discussed is capable of driving any radiant energy detector requiring a source of electrical bias as well as protection from high-intensity radiant energy. The configuration described provides a source of bias in which only semiconductor or solid-state devices are used and the high-voltage control vacuum tube used in general practice is eliminated. In addition, the bias supply is placed within the feedback loop with the different rise and fall time constants associated inherently therewith equalized by a time constant compensation circuit. Although stability problems associated with feedback loops have not been discussed in detail, those techniques used in general practice may be employed to achieve the required stability.

It now should be apparent that the present invention provides a radiant energy analyzer feedback system wherein a semiconductor or solid-state bias supply for a radiant energy detector is included within the feedback loop along with time constant compensation and overload protection circuits. Although particular components and circuit arrangements have been discussed in connection with the specific embodiments of the circuit constructed in accordance with the teachings of the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the spirit of the invention.

What is claimed is:

1. A radiant energy analyzer system comprising:

a radiant energy detector having a bias electrode and a signal electrode, said radiant energy detector generating an electrical signal at said signal electrode in response to incident radiant energy;

selective detector means having an input terminal and at least one output terminal, said input terminal being connected to said signal electrode of said radiant energy detector, said selective detector means generating an output electrical signal having a magnitude proportional to the amplitude of selected segments of the electrical signal from said radiant energy detector;

oscillator means for generating an alternating signal having an amplitude inversely proportional to the magnitude of the output signal from said selective detector means, said oscillator means having a pair of output terminals between which the alternating signal is generated and an input control terminal connected to the output terminal of said selective detector means;

rectifier means having a pair of input terminals connected to said pair of output terminals of said oscillator means and having an output terminal connected to said bias electrode of said radiant energy detector, said rectifier means producing a varying output DC bias having a magnitude proportional to the amplitude of the alternating signal from said oscillator means; and an overload circuit connected between the input terminal of said selective detector means and the input terminal of said oscillator means, said overload circuit providing a conducting path between the input terminals of said selective detector means and said oscillator means when the amplitude of the electrical signal at the input terminal of said selective detector means exceeds a predetermined threshold and said overload circuit providing a nonconducting path when the amplitude of the electrical signal is less than said predetermined threshold.

2. The radiant energy analyzer defined in claim 1 wherein said overload circuit comprises:

a first resistor connected to the input terminal of said selective detector means;

a second resistor connected to said first resistor for supplying a predetermined threshold voltage to the junction of said first and second resistors from a voltage applied to the other end of said second resistor; and a diode having an anode connected to the junction of said first and second resistors and a cathode connected to the input terminal of said oscillator means, said diode being normally biased nonconducting by the threshold voltage and rendered conducting by the magnitude of the electrical signal at the input to the selective detector exceeding the threshold voltage.

3. The radiant energy analyzer defined in claim 1 wherein said oscillator means comprises:

a transformer having input, feedback, and output windings, the output windings being connected to said rectifier means and the input winding having a center tap connected to the selective detector means output terminal; and a pair of transistors having electrodes connected to the feedback and input windings of said transformer to form a free running multivibrator.

4. The radiant energy analyzer defined in claim 3 wherein said rectifier means comprises:

at least one rectifier diode connected to the output winding of said transformer; and a resistance-capacitance network means having input and output terminals, the input terminals being connected to said diode and the output terminal being connected to the bias electrode of said radiant energy detector means, said resistance-capacitance network means transmitting only a slowly varying DC bias from the input to output terminals thereof.

5. The radiant energy analyzer defined in claim 4 further comprising a time constant compensation circuit connected between the output terminal of said selective detector means and the input terminal of said oscillator means for generating a first time constant in response to an increasing electrical signal from said selective detector means and generating a second time constant in response to a decreasing output electrical signal from said selective detector means, the first time constant being different from the second time constant whereby compensation is obtained for respective time constants inherent in said rectifier means.

6. The radiant energy analyzer defined in claim 5 wherein said time constant compensation circuit comprises;

a resistor connected between the output terminal of said selective detector means and the input terminal of said oscillator means;

a diode connected in parallel with said resistor and having its cathode connected to the input terminal of said oscillator means; and a capacitor connected from the input terminal of said oscillator means to an electrical ground.

7. In a radiant energy analyzer of the type having reference and sample beam paths and means for directing radiant energy passing said reference and sample beam paths alternately along a single beam path, the improvement comprising:

detector means positioned to receive radiation passing said single beam path;

variable bias means connected to said detector means, said detector generating an electrical output signal proportional to the instantaneous incident radiation and the magnitude of the biased on said detector;

feedback means connected between the output of said detector means and said variable bias means, said feedback means including means for selecting the portion of said electrical output signal proportional to the energy in said reference beam path and controlling said variable bias means to maintain said portion of said electrical output signal substantially constant;

overload protection means connected between the output of said detector means and said feedback means and bypassing at least a portion of said feedback means for reducing said bias on said detector means when the output of said detector means exceeds a predetermined value.

8. In a radiant energy analyzer having a reference channel and a feedback loop wherein a voltage signal from the reference channel controls the magnitude of an electrical bias to a radiant energy detector, the improvement comprising;

a voltage-controlled bias supply having an input voltage control terminal and an output bias terminal, said voltage controlled bias supply being included within the feedback loop, the output bias terminal of said voltage-controlled bias supply being connected to the radiant energy detector to provide an electrical bias thereto, said voltage bias supply inherently having a first time constant in response to an increasing voltage applied to the control terminal thereof and a second time constant in response to a decreasing voltage applied to the control terminal where the first and second time constants are different;

a time constant compensating circuit connected within the feedback loop for compensating the difference between the first and second time constants of said voltage-controlled bias supply; and an overload protection circuit connected between the radiant energy detector and the control terminal of said bias supply for establishing an electrical conducting and nonconducting path between the radiant energy detector respectively exceed and falls below a predetermined threshold value.

9. The radiant energy analyzer defined in claim 8 wherein said compensation circuit comprises:

a resistor connected in series with the feedback loop;

a diode connected in parallel with said resistor;

a capacitor connected to said resistor in a manner to form a low-pass filter therewith.

10 The radiant energy analyzer defined in claim 8 wherein said overload protection circuit comprises:

a pair of resistors connected in series one end of which is connected to the radiant energy detector, the other end having a threshold voltage applied thereto;

a diode having its cathode connected to the control terminal of said bias supply and its anode connected to the junction of said pair of resistors.

11. A radiant energy analyzer comprising:

a photomultiplier having a bias electrode and a signal electrode, said photomultiplier generating an electrical signal at the signal electrode in response to incident radiant energy;

amplifier means having an input terminal connected to said signal electrode of said photomultiplier and an output terminal, said amplifier means amplifying the electrical signal from said photomultiplier;

a series resistor pair having one end connected to the output of said amplifier means and the other end having a predetermined threshold voltage applied thereto;

a first diode having its anode connected to the junction of said series resistor pair;

selective detector means having an input terminal and at least a first output terminal, said input terminal being connected to said amplifier means output terminal, said selective detector generating a signal at said first output terminal having a magnitude proportional to selected segments of the electrical signal from said photomultiplier;

a resistor having one end connected to the first output terminal of said selective detector and the other end connected to the cathode of said first diode;

a second diode connected in parallel with said resistor, the anode end of which is connected to the one end of said resistor;

a capacitor connected between the junction of the other end of said resistor and the cathodes of said first and second diodes and a circuit ground;

oscillator means for generating an alternating signal having an amplitude inversely proportional to the magnitude of a voltage appearing across said capacitor, said oscillator means having an input terminal connected to the junction of said capacitor and said resistor and a pair of output terminals between which the alternating signal is generated; and rectifier means having a pair of input terminals connected to the pair of output terminals of said oscillator means and having an output terminal connected to the bias electrode of said photomultiplier, said rectifier means producing a varying output DC bias having a magnitude proportional to the amplitude of the alternating signal from said oscillator means.

12. In a radiant energy analyzer of the type having an electrically controlled variable bias supply for supplying electrical bias to a radiant energy detector, the improvement comprising a threshold device having an input connected to receive an electrical signal from the radiant energy detector and having an output connected to the variable bias supply at which output an overload signal is generated in response to the electrical signal from the radiant energy detector exceeding a predetermined threshold, the electrical bias being controlled by the overload signal in a manner to reduce and maintain the magnitude of the electrical signal from the radiant energy detector essentially at the predetermined threshold level.

13. In a radiant energy analyzer having an electrically controlled variable bias supply for supplying electrical bias to a radiant energy detector, the improvement comprising:

a series pair of resistors having an electrical signal from the radiant energy detector applied to one end and a predetermined threshold voltage applied to the other end thereof; and a diode connected between the junction of said series pair of resistors and the electrically controlled variable bias supply, said diode being conducting when the amplitude of the electrical signal from the radiant energy detector is less than a value proportional to the magnitude of the predetermined threshold voltage and conducting when the amplitude of the electrical signal exceeds the value proportional to the magnitude of the threshold voltage for applying a control signal to the variable bias supply to reduce the magnitude of bias in response to overload of the radiant energy detector.

PO-1050
(5/69)

UNITED STATES PATENT OFFICE
CERTIFICATE OF CORRECTION

Patent No. 3,611,042 Dated October 5, 1971

Inventor(s) Attila Denes Boronkay

It is certified that error appears in the above-identified patent and that said Letters Patent are hereby corrected as shown below:

| | |
|---|---|
| Column 1, line 2, | delete "and" (first occurrence); |
| Column 1, line 49, | "larger" should be --large--. |
| Column 2, line 11, | "OVerload" should be --Overload--. |
| Column 3, line 23, | "an" should be --and--. |
| Column 5, line 60, | "terminals" (second occurrence) should be --terminal--. |
| Column 6, line 23, | "biased" should be --bias--; |
| Column 6, line 59, | after "detector" insert --and said bias supply when a signal from the radiant energy detector--; |
| Column 6, line 60, | "exceed" should be --exceeds--. |
| Column 8, line 30, | "conducting" should be --nonconducting--. |

Signed and sealed this 28th day of March 1972.

(SEAL)
Attest:

EDWARD M.FLETCHER,JR.
Attesting Officer

ROBERT GOTTSCHALK
Commissioner of Patents